C. P. STEINMETZ.
VOLTAGE REGULATOR.
APPLICATION FILED JUNE 9, 1909.

973,579. Patented Oct. 25, 1910.

Witnesses
J. Earl Ryan.
J. Ellis Glen

Inventor.
Charles P. Steinmetz
by
Atty.

//BEST AVAILABLE COPY

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

VOLTAGE-REGULATOR.

973,579.

Specification of Letters Patent. Patented Oct. 25, 1910.

Application filed June 5, 1909. Serial No. 501,049.

*To all whom it may concern:*

Be it known that I, CHARLES P. STEINMETZ, a citizen of the United States, residing at Schenectady, county of Schenectady, State of New York, have invented certain new and useful Improvements in Voltage-Regulators, of which the following is a specification.

My invention relates to electrical distribution systems, and has for its object an improved method and means for the regulation of the voltage of such systems.

As is well known, the load on a three-phase polyphase system may be of a balanced or unbalanced character. In the case where a load is balanced, for example, where it consists of three-phase or polyphase motors, rotary converters, etc., three-phase or polyphase regulators of the induction or compensator type may be used. These regulators are constructed so as to regulate the voltage of all of the phases at the same time, and in the same manner; but cannot independently regulate the voltage of each phase. In the case where the load is unbalanced, for example, where it consists of lighting circuits, it is necessary to regulate the voltage of each phase independently, and, therefore, in the past, a plurality of single-phase regulators have been employed. This is not only inconvenient, because a number of independent regulators are used, but has the great defect that when one regulator is adjusted to regulate the voltage of one phase, the magnitude of the voltage of an adjacent phase is thereby affected.

The object of my invention is to provide a method and means whereby the voltage of any phase of such a system may be altered without changing the magnitude of the voltage of an adjacent phase.

A further object of my invention is to avoid the use of independent regulators, and substitute therefor a single regulator, which for a three-phase system may be a single three-phase compensator or transformer.

For a further understanding of my invention, reference may be had to the accompanying drawings, where—

Figure 1:
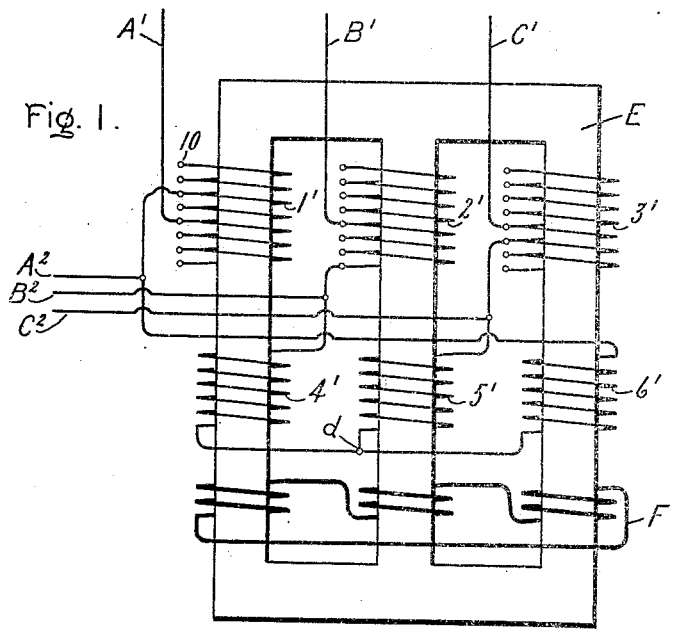

Figure 1 shows diagrammatically the connections of the regulator which I employ; and Figs. 2, 3, 4 and 5 are vector diagrams, showing the relation between the several phase voltages of a three-phase system under varying conditions.

Figure 2:
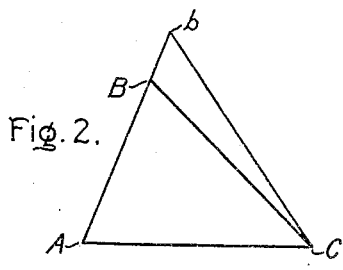
Figure 3:
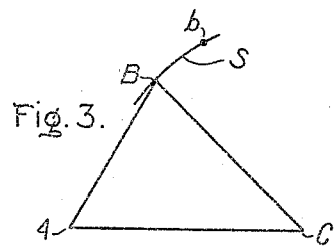
Figure 4:
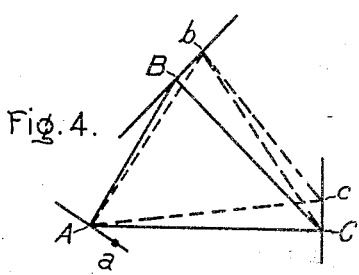

Referring first to Fig. 2, the triangle A B C is a voltage triangle for a three-phase system, the phase A B having a lower voltage than the other two phases. If it be attempted to raise the voltage of phase A B by the use of single-phase regulator, the additional voltage B b produced in the regulator will be in phase with A B. This will cause the voltage of phase B C to be increased until it becomes b C, and thus its magnitude will be increased, which condition may be one that is not desired. If it is desired to increase the voltage of phase A B, without disturbing the magnitude of the voltage of the adjacent phase B C, it is necessary to add in a positive or negative sense to A B a voltage whose locus will be the arc of the circle S, which has a radius equal to C B, and whose center is C, as shown in Fig. 3. If the voltage of phase A B is increased by such a voltage as that described, the point b will assume some such position as that shown in Fig. 3.

I have found that since the required change in voltage is ordinarily small compared with the voltage of the phase to be regulated,—that is, the voltage B b, whether it is to be added in a positive or a negative sense to the voltage A B, is but a small percentage of A B, the phase of this voltage B b will be substantially in quadrature with the voltage of the adjacent phase B C. To accomplish, then, an object of my invention, that is, of altering the voltage of one phase of a polyphase system without changing the magnitude of the voltage of an adjacent phase, by adding in a positive or negative sense to the voltage of the phase to be regulated a voltage which is substantially in quadrature with the voltage of the adjacent phase, and so does not affect the magnitude of this latter voltage. This is shown more specifically in Fig. 4, where the voltage B b is substantially in quadrature with voltage b C, and thus triangle A b C is obtained. This triangle may be changed also by adding voltage A a and C c, if desired.

In a three-phase system, it is well known that the Y-voltages are in quadrature with the delta voltages, and, therefore, for an independent regulation of the voltages of a three-phase system I am enabled to employ a single three-phase transformer or compensator by connecting the primary circuits in Y, and employing certain additional regulating windings connected in the manner hereinafter described. Referring to Fig. 1, I have shown the connections which I may employ. E is a magnetic core. $A^1 B^1 C^1$ are the three conductors of a three-phase system. These conductors may be connected to any suitable source of supply, which is not shown. $A^2 B^2 C^2$ are conductors which lead to a load whose voltage it is desired to regulate. This load may consist of various translating devices, such as lamps connected across the several phases, and is not shown. Surrounding the core legs are primary windings $4^1 5^1 6^1$ connected in Y with a common neutral point $d$. Also surrounding the core legs are regulating windings $1^1 2^1 3^1$ with regulating taps 10. The conductors $A^1 B^1 C^1$ are connected to substantially the central points of the regulating windings. The ends of the primary windings not connected to the neutral point $d$ are connected to the conductors $A^2 B^2 C^2$. These conductors $A^2 B^2 C^2$ are connected to the regulating taps of the regulating windings in such fashion as is well understood by those skilled in the art, with the portions of the regulating windings included in the several circuits, which give the desired added voltage to the several phases; it being understood that this voltage may be added in a positive or a negative sense. The regulating and primary windings on the same leg are not connected together, but the regulating winding on one leg is connected to the primary winding on another leg in such a fashion as to produce the addition of a voltage to any phase that will be substantially in quadrature with the voltage of the adjacent phase, and thus not affect the magnitude of the latter. The manner in which I connect the primary windings to the regulating windings will be explained later with reference to Fig. 5. In addition to the windings described is an auxiliary winding F, which consists of coils surrounding each leg of the core, which coils are connected so as to form a closed delta. The object of this auxiliary winding is to maintain a stable neutral point $d$ for the primary windings $4^1 5^1 6^1$ in the manner which is well understood. It will be obvious, however, that other means may be employed for maintaining the neutral point stable, such as connecting it to the neutral conductor of the system if the system has such a neutral conductor, and I, therefore, have not illustrated such connection, and do not limit myself to any particular connection to maintain a stable neutral point.

Figure 5:
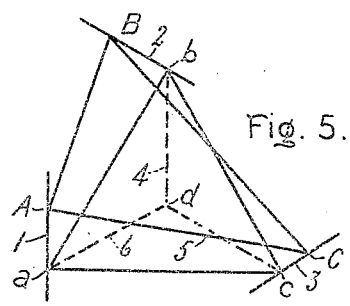

For an understanding of the principle of the operation of the apparatus shown in Fig. 1, reference may be had to Fig. 5. A B C is a voltage triangle for the conductors $A^1 B^1 C^1$, and it is so drawn as to represent a condition of voltage which it is desired to change before conductors $A^2 B^2 C^2$ are energized therefrom. Let it be assumed that it is desired to increase the voltage of phase A B. The dotted lines 4 5 6 represent the voltages for the primary Y-connected windings $4^1 5^1 6^1$, the neutral point being $d$, the other terminals of these windings being connected to the conductors $A^1 B^1 C^1$ through the regulating windings $1^1 2^1 3^1$. If it is desired to increase the voltage of phase A B and not affect the magnitude of the voltage of the adjacent phase A C, in accordance with my invention, the voltage to be added to A B must be substantially in quadrature with the voltage of the adjacent phase A C. The added voltage, therefore, must be substantially parallel to the voltage shown by vector 4. This voltage to be added to phase A B may be represented by the line 1, and the magnitude of this voltage by the line A $a$. Referring now to Fig. 1, it will be seen that regulating coil $1^1$, to which is connected conductor $A^1$, is energized by the primary winding $4^1$. Therefore, regulating coil $1^1$ will have impressed upon it a voltage similar in phase to that of coil $4^1$, which voltage is represented by vector 4 of Fig. 5, and is substantially in quadrature with the voltage of phase A C. The amount of voltage which may be added in a positive or negative sense to the voltage of phase A B may be regulated by the regulating taps to which is connected conductor $A^2$,—that is, in the position shown in the drawing, conductor $A^2$ is connected to the second tap of winding $1^1$ above the tap to which conductor $A^1$ is connected for the purpose of increasing the voltage of phase A B. If it is desired to decrease the voltage in this phase, conductor $A^2$ would be connected to a tap of winding $1^1$, which would be as shown in the drawing below the tap to which conductor $A^1$ is connected. This will be well understood by those skilled in the art.

Referring now to both Figs. 1 and 5, it will be seen that primary windings $5^1 6^1$ add to the regulating windings $2^1 3^1$ voltages of phases corresponding in position to vectors 5 and 6, which vectors are substantially in quadrature with phases A B or $a b$ and phases A C or $a c$, and that therefore by proper adjustment of the connections on the regulating windings $2^1 3^1$ point B may be moved to point $b$, and point C may be moved to point $c$, and thus any desired relation of the voltages of the several phases may be obtained,—the triangle $a b c$ representing a condition of balanced voltage. It will further be obvious that while I have illustrated a regulation for each phase of such a character as to alter the voltage triangle from A B C to $a b c$ by altering the voltage of each phase, it may only be desirable or necessary to alter the voltage of one or two phases; in which case, however, the principle which I have described will be the same. It will also be obvious that the voltage to be added to any phase must not only be substantially in quadrature with the voltage of an adjacent phase, but must be in quadrature with the voltage of the adjacent phase, which, as shown by the triangle of voltages, meets the voltage of the phase which it is desired to regulate at the corner of the voltage triangle, where the regulating voltage is to be added.

While I have illustrated my invention as embodied with a particular form of connections and apparatus, I do not limit myself to the particular embodiment which I have described, but seek in the appended claims to cover all such embodiments of connections and apparatus as will be obvious to those skilled in the art, and will not depart from the spirit of my invention.

What I claim as new and desire to secure by Letters Patent of the United States, is—

1. The method of regulating the voltage of one or more phases of a polyphase system independently of the other phases, consisting in adding to the voltage of the phase to be regulated a regulating voltage which is substantially in quadrature with the voltage of the adjacent phase and so does not affect the latter.

2. The method of producing a balanced system of voltages from an unbalanced polyphase system or vice versa, consisting in adding to the voltage of one or more of the phases a regulating voltage of proper value that is substantially in quadrature with the voltage of the adjacent phase and so does not affect the latter.

3. The combination with an unbalanced polyphase system, of means for deriving therefrom a balanced system comprising a polyphase translating device having windings connected thereto, and regulating windings connected in series with one or more of the windings of the polyphase translating device each arranged to produce a voltage substantially in quadrature with the voltage of the phase adjacent to the one in which it is connected.

4. The combination with a three-phase system, of a three-phase Y-wound transformer connected thereto, and regulating windings in inductive relation with each of the transformer windings connected each in series with one of the transformer windings, the regulating and transformer windings being so connected that each transformer winding induces in each regulating winding a voltage substantially in quadrature with the voltage of a phase of the system adjacent to the regulating winding and so does not affect the latter voltage.

5. The combination with a three-phase system, of a three-phase Y-wound transformer connected thereto, regulating windings in inductive relation with each of the transformer windings each connected in series with one of the transformer windings, the regulating and transformer windings being so connected that each transformer winding induces in each regulating winding a voltage substantially in quadrature with the voltage of a phase of the system adjacent to the regulating winding and so does not affect the latter voltage, and means for maintaining the neutral point of the transformer windings stable.

6. The combination with a three-phase system, of a three-phase Y-wound transformer connected thereto, regulating windings in inductive relation with each of the transformer windings each connected in series with one of the transformer windings, the regulating and transformer windings being so connected that each transformer winding induces in each regulating winding a voltage substantially in quadrature with the voltage of a phase of the system adjacent to the regulating winding and so does not affect the latter voltage, and auxiliary windings connected in inductive relation to each transformer winding connected so as to form a closed delta.

In witness whereof, I have hereunto set my hand this 8th day of June, 1909.

CHARLES P. STEINMETZ.

Witnesses:
BENJAMIN B. HULL,
HELEN ORFORD.